UNITED STATES PATENT OFFICE.

PABLO GONZÁLES GARZA, OF SAN ANTONIO, TEXAS.

CORN-FLOUR AND METHOD OF MAKING THE SAME.

1,334,366.      Specification of Letters Patent.    Patented Mar. 23, 1920.

No Drawing.     Application filed December 14, 1918. Serial No. 266,765.

*To all whom it may concern:*

Be it known that I, PABLO GONZÁLES GARZA, a citizen of the United States, residing at San Antonio, in the county of Bexar and State of Texas, have invented a new and useful Corn-Flour and Method of Making the Same, of which the following is a specification.

This invention relates to corn flour and more particularly to a method of making the same whereby a high grade flour is produced from corn, which will not deteriorate but can be preserved equally as well as wheat flour and like products, and does not have any of the objectionable features of the corn flour produced in the usual manner.

One of the best known methods of producing flour from corn is to grind the corn in its dry state, but the friction produced by this operation imparts to the product a peculiar and objectionable flavor. Furthermore it is practically impossible to prevent small particles of indigestible substances such as stone and the like from becoming mixed with the product and thus reducing its quality. Another method followed, especially in Mexico, consists in boiling the corn in water in which unslaked lime has been dissolved. This has been done to soften the outer skin of the kernel, and enable it to be removed readily with but little friction. The corn is allowed to stand in the same water for several hours until it is thoroughly saturated and softened. Afterward it is ground in a suitable mill and reduced to meal without any perceptible heating, this meal being used in making the well known unleavened bread known as "tortillas."

In addition to the foregoing methods corn meal has been produced by following the last named method up to the point where the corn is ground whereupon instead of grinding in wet condition it is first dried and subsequently ground. The results, however, are the same as produced when meal is made from dry corn, and products made from the meal have a disagreeable odor and taste and contain minute indigestible particles.

It is an object of the present invention to overcome all of the objectionable features heretofore present in the production of corn flour. To do this the corn is first boiled in water containing unslaked lime and allowed to stand in water for from six to eight hours so that the entire kernel, including the tough, rubber-like embryo is thoroughly saturated and softened. The corn, while in this condition, is ground and all portions thereof reduced to a paste-like mass. This material, while in its wet condition, is formed, without the use of pressure, into small cakes preferably about one inch square and one-eighth inch thick and are dried in any suitable manner. As the cakes are small they will dry quickly without fermentation or loss of any of the essentials of the grain. After being thoroughly dried the cakes are ground into a fine flour of a high grade which is free from impurities, is fully digestible, and can be kept for a long time without deterioration.

While the method herein described is designed more especially in producing flour from corn it is to be understood that it can be followed in producing flour from other cereals and as the cereals are first softened by being saturated with water, the power required for reducing them to meal is materially reduced and the cost of the production accordingly lowered.

What is claimed is:

The herein described method of producing a high grade corn flour which consists in boiling corn in water containing lime and allowing the kernel to soak in the water for a period of from six to eight hours thereby to soften all portions of the kernel, then grinding the corn while in a saturated condition to finely divide all portions thereof and produce a paste-like mass, subsequently molding said mass into small thin cakes and drying them without producing fermentation or losing any essentials of the grain, and finally grinding the cakes into a fine flour.

In testimony that I claim the foregoing as my own, I have hereto affixed my signature in the presence of two witnesses.

PABLO GONZÁLES GARZA.

Witnesses:
    CHAS. A. MASON,
    S. COINSHEAN.